United States Patent
Ertas et al.

(10) Patent No.: US 9,879,720 B2
(45) Date of Patent: Jan. 30, 2018

(54) BEARING DAMPER WITH EXTERNAL SUPPORT SPRING SYSTEMS AND METHODS

(71) Applicant: General Electric Company, Schenectady, NY (US)

(72) Inventors: Bugra Han Ertas, Slingerlands, NY (US); Kyle Robert Snow, Loveland, OH (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 15/147,706

(22) Filed: May 5, 2016

(65) Prior Publication Data

US 2017/0321747 A1    Nov. 9, 2017

(51) Int. Cl.
*F16C 27/02* (2006.01)
*F16C 27/04* (2006.01)
(Continued)

(52) U.S. Cl.
CPC .......... *F16C 27/045* (2013.01); *F01D 25/164* (2013.01); *F16F 15/022* (2013.01); *F05D 2220/31* (2013.01); *F05D 2220/32* (2013.01); *F05D 2220/40* (2013.01); *F05D 2240/54* (2013.01); *F05D 2260/96* (2013.01); *F16C 2360/00* (2013.01); *F16F 2222/12* (2013.01);
(Continued)

(58) Field of Classification Search
CPC .............................. F01D 25/164; F16C 27/045
USPC ..................................................... 384/99, 117
See application file for complete search history.

(56) References Cited

U.S. PATENT DOCUMENTS 3,994,541 A    11/1976  Geary et al.
4,213,661 A *   7/1980  Marmol ................ F16C 27/045
                                                                   384/215
(Continued)

FOREIGN PATENT DOCUMENTS

EP        2187072 A1    5/2010
FR        3013760 A1    5/2015
WO     2014204633 A1   12/2014

OTHER PUBLICATIONS

Taylor, D.L., et al.; "Analysis and Design of Segmented Dampers for Rotor Dynamic Control", Journal of Lubrication Technology, vol. 104, Issue: 1, pp. 7, Jan. 1, 1982.
(Continued)

*Primary Examiner* — Christopher Schwartz
(74) *Attorney, Agent, or Firm* — Nitin N. Joshi (57) ABSTRACT

One embodiment describes a bearing damper including a housing; a damper with an annular gap and an internal spring, in which the annular gap is formed between an inner rim and an outer rim of the damper, the internal spring circumferentially bounds the annular gap, the outer rim is coupled to the housing, and the annular gap is configured to be filled with fluid used to dampen vibrations produced on a drive shaft; and an external spring coupled to the housing and to the inner rim, in which the external includes an axial stiffness engineered to externally offset axial forces exerted on the inner rim of the and a radial stiffness engineered to externally offset a first portion of radial forces exerted on the inner rim and to permit a second portion of the radial forces to propagate the vibrations from the drive shaft to the inner rim.

18 Claims, 4 Drawing Sheets

(51) Int. Cl.
*F16F 15/02* (2006.01)
*F01D 25/16* (2006.01)

(52) U.S. Cl.
CPC ....... *F16F 2226/04* (2013.01); *F16F 2230/30* (2013.01)

(56) References Cited

U.S. PATENT DOCUMENTS

| | | | | |
|---|---|---|---|---|
| 4,781,077 | A * | 11/1988 | El-Sahfei | F01D 25/164 464/180 |
| 5,110,257 | A * | 5/1992 | Hibner | F01D 25/164 415/119 |
| 5,121,819 | A | 6/1992 | Tecza | |
| 5,178,400 | A * | 1/1993 | Singh | F01D 25/164 277/644 |
| 5,316,391 | A * | 5/1994 | Monzel | F16F 1/32 384/99 |
| 5,344,239 | A * | 9/1994 | Stallone | F01D 25/164 384/99 |
| 5,603,574 | A | 2/1997 | Ide et al. | |
| 6,135,639 | A * | 10/2000 | Dede | F16C 27/045 384/581 |
| 7,517,152 | B1 | 4/2009 | Walsh | |
| 7,731,426 | B2 * | 6/2010 | Meacham | F01D 25/164 384/311 |
| 7,798,820 | B2 * | 9/2010 | Hong | H05K 1/117 385/92 |
| 7,857,519 | B2 | 12/2010 | Kostka et al. | |
| 8,083,413 | B2 * | 12/2011 | Ertas | F16C 17/035 384/117 |
| 8,272,786 | B2 * | 9/2012 | Cottrell | B64D 27/26 188/298 |
| 9,328,797 | B2 * | 5/2016 | Zeidan | F16F 15/1215 |
| 9,599,152 | B2 * | 3/2017 | Freeman | F16F 15/0237 |
| 2007/0248293 | A1 * | 10/2007 | Pettinato | F16C 17/03 384/99 |
| 2009/0304313 | A1 | 12/2009 | Ertas | |
| 2013/0051982 | A1 * | 2/2013 | Hindle | F01D 25/164 415/119 |
| 2015/0104123 | A1 * | 4/2015 | Ertas | F01D 25/164 384/119 |

OTHER PUBLICATIONS

Ertas, Bugra, et al.; "Stabilizing a 46MW Multistage Utility Steam Turbine Using Integral Squeeze Film Bearing Support Dampers", Journal of Engineering for Gas Turbines and Power, vol. 137, Issue:5, pp. 11, May 1, 2015.
EP Search Report, EP17169534, dated Oct. 5, 2017.

* cited by examiner

BEARING DAMPER WITH EXTERNAL SUPPORT SPRING SYSTEMS AND METHODS

BACKGROUND

The present disclosure generally relates to turbomachine systems, more particularly, to bearing dampers used in turbomachine systems.

Generally, a turbomachine system may facilitate transfer of energy between a fluid and a rotor. For example, a turbomachine system (e.g., a compressor) may use the rotor to transfer energy to the fluid by compressing the fluid. Additionally or alternatively, a turbomachine system (e.g., a turbine engine) may use the rotor to extract energy from a flow of the fluid. To facilitate the transfer of energy, tangential force may actuate (e.g., rotate) the rotor.

However, the rotor may exert axial and/or radial forces on the rest of the turbomachine system. For example, rotation of the rotor may cause mass imbalance and, thus, vibrations (e.g., radial forces) in the turbomachine system. Additionally, due to gravity, the rotor may exert a radial (e.g., downward) force. Furthermore, when the turbomachine system is in motion, the rotor may exert an axial (e.g., thrust) force.

To help account for various forces exerted by the rotor, the turbomachine system may include one or more bearing damper assemblies. For example, a bearing damper assembly may dissipate vibrations produced on the rotor, thereby reducing the vibrations transferred to the rest of the turbomachine system. Additionally, a bearing damper assembly may support the rotor against other radial forces and/or axial forces to facilitate actuation of the rotor. However, in some instances, tuning a bearing damper assembly to account for the other radial and/or axial forces may affect ability of the bearing damper to dissipate vibrations.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a bearing damper assembly to be used in a turbomachine system is described. The bearing damper assembly includes a housing; a segmented squeeze film damper with a first annular gap and a first internal spring, in which the first annular gap is formed between an inner rim and an outer rim of the segmented squeeze film damper, the first internal spring circumferentially bounds the first annular gap, the outer rim is coupled to the housing, and the first annular gap is filled with fluid used to dampen vibrations produced on a drive shaft of the turbomachine system; and an external spring coupled to the housing and to the inner rim of the segmented squeeze film damper, in which the external spring includes an axial stiffness engineered to externally offset axial forces exerted on the inner rim of the segmented squeeze film damper; and a radial stiffness engineered to externally offset a first portion of radial forces exerted on the inner rim segmented squeeze film damper and to permit a second portion of the radial forces to propagate the vibrations from the drive shaft to the inner rim.

In another embodiment, a method of manufacturing a bearing damper assembly used in a turbomachine system is described. The method includes coupling an outer rim of a damper to an inner surface of a housing such that an inlet port formed in the housing is fluidly coupled to an annular gap formed partially along a circumference between the outer rim and an inner rim of the damper, in which the annular gap is to be filled with fluid used to dampen vibrations produced during operation of the turbomachine system; coupling a first end seal to a first side surface of the inner rim such that a first outlet port formed in the first end seal is fluidly coupled to the annular gap; coupling a first end of an external spring to the inner surface of the housing; and coupling a second end of the external spring to a second side surface of the inner rim, wherein the external spring facilitates tuning axial stiffness of the external spring to substantially offset axial forces exerted on the inner rim to facilitate maintaining size of the first outlet port substantially constant during operation of the turbomachine system; and tuning radial stiffness of the external spring relatively independent from the axial stiffness to substantially offset a first portion of radial forces exerted on the inner rim to facilitate maintaining average size of the annular gap substantially constant during operation of the turbomachine system.

In another embodiment, a turbomachine system including an external spring is described. The external spring includes a first end to be coupled to an inner surface of a housing that houses a damper by coupling to an outer rim of the damper; a second end to be coupled to a first side surface of an inner rim of the damper; and a plurality of spring fingers formed between the first end and the second end of the external spring. The plurality of spring fingers include an axial stiffness that externally offset axial forces exerted on the inner rim of the damper to facilitate maintaining size of an outlet port on the damper substantially constant during operation of the turbomachine system; and a radial stiffness that facilitate propagating vibrations produced during operation of the turbomachine system to the damper, and externally offset other radial forces exerted on the inner rim of the damper to facilitate maintaining average distance between the inner rim and the outer rim of the damper.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, a turbomachine system may actuate (e.g., rotate) a rotor to facilitate transferring energy between the rotor and a fluid. To facilitate actuating the rotor, the turbomachine may include one or more bearing damper assemblies. Specifically, a bearing damper assembly may dissipate vibrations (e.g., dynamic radial forces) produced on the rotor and/or support the rotor against other radial and/or axial forces exerted by the rotor on the rest of the turbomachine system.

For example, a bearing damper assembly may include a damper (e.g., a segmented squeeze film damper), which includes multiple annular gaps separated by internal springs. Additionally, the bearing damper assembly may include bearings coupled between the damper and a drive shaft. As such, force exerted on the drive shaft may be transferred to the damper through the bearings. For example, vibrations produced on the shaft may propagate from the drive shaft, through the bearings, and into the damper. In the damper, the vibrations may be dissipated by fluid in the annular gaps.

In some embodiments, the damping characteristics of the damper may be based at least in part on pressure of the fluid in the annular gaps and/or size of the annular gaps. For example, adjusting fluid pressure and/or annular gap size may affect vibration frequencies dampened (e.g., dissipated) by the damper. As such, in some embodiments, the fluid pressure and/or annular gap size may be tuned (e.g., adjusted) to target the natural frequency of the turbomachine system, which may facilitate reducing affect the vibrations have on the rest of the turbomachine system.

Additionally, as described above, the drive shaft may exert other radial and/or axial forces on the bearing damper assembly. When insufficiently offset, the axial and/or radial forces may act to change the fluid pressure and/or annular gap size of the damper and, thus, targeted vibration frequencies. For example, axial (thrust) forces may cause axial movement in the damper, which may disrupt flow of fluid through an axial gap and, thus, fluid pressure in the annular gap. Additionally, a radial (e.g., gravitational) force may cause radial movement in the damper, which may reduce size of a bottom annular gap and/or increase size of a top annular gap. Accordingly, to facilitate maintaining damping characteristics (e.g., dampened vibration frequencies and/or damping capabilities), the bearing assembly may offset the axial and/or radial forces to facilitate maintaining annular gap size and/or fluid pressure in the annular gaps.

In some instances, the axial and/or radial forces may be offset by increasing stiffness (e.g., decreasing flexibility) of the internal strings in the damper. For example, increasing stiffness of the internal springs may increase both radial stiffness (e.g., ability to offset radial forces) and axial stiffness (e.g., ability to offset axial forces). In other words, axial stiffness and radial stiffness of the internal springs are directly linked and, thus, are unable to be independently tuned. As such, using the internal springs to offset axial and radial forces may limit tuning flexibility and, thus, operational efficiency (e.g., ability to dampen vibrations) of the damper.

Accordingly, the present disclosure provides techniques to improve tuning flexibility of a damper (e.g., a segmented squeeze film damper) in a bearing damper assembly, which may facilitate improving operational efficiency of the bearing damper assembly. To facilitate, in some embodiments, an external spring (e.g., a squirrel cage) may be coupled between the damper and a housing of the bearing damper assembly to externally offset radial and/or axial forces exerted on the damper. In other words, the external spring may facilitate externally maintaining axial end seal gap size and/or fluid pressure in the annular damper land gaps, thereby enabling the damper to maintain target damping characteristics (e.g., target vibrations at natural frequency and/or target damping value).

In this manner, the external spring may facilitate using the internal springs of the damper primarily to circumferentially separate the annular damper land gap. Accordingly, in some embodiments, the stiffness of the internal springs may be tuned based primarily on stress on the internal springs caused by deflection of the damper when dissipating vibrations. In other words, since not tuned to offset axial and/or radial forces, the stiffness of the internal springs may be reduced to a stiffness threshold, below which deflection of the damper could potentially break (e.g., snap) one or more internal springs.

Additionally, since external from the damper, limitations on physical configuration of the external spring may be less than on the internal springs. Thus, in some embodiments, the physical configuration of the external spring may enable relatively independent tuning of the axial stiffness and radial stiffness. For example, while maintaining approximately the same axial stiffness, a squirrel cage (e.g., an external spring) may be tuned to various radial stiffnesses. In this manner, the external spring may be tuned to provide an axial stiffness that substantially offsets any axial forces, thereby reducing likelihood of axial movement in the damper. On the other hand, the external spring may be tuned to provide a radial stiffness that enables vibrations to propagate through the bearing damper assembly, but substantially offsets the other radial forces, thereby reducing the likelihood of radial deflection in the damper. In other words, the external spring may be engineered (e.g., designed) to have a high axial stiffness (e.g., sufficient to substantially offset axial forces) and an appropriate radial stiffness (e.g., sufficient to facilitate vibration damping while reducing radial deflection).

Figure 1:
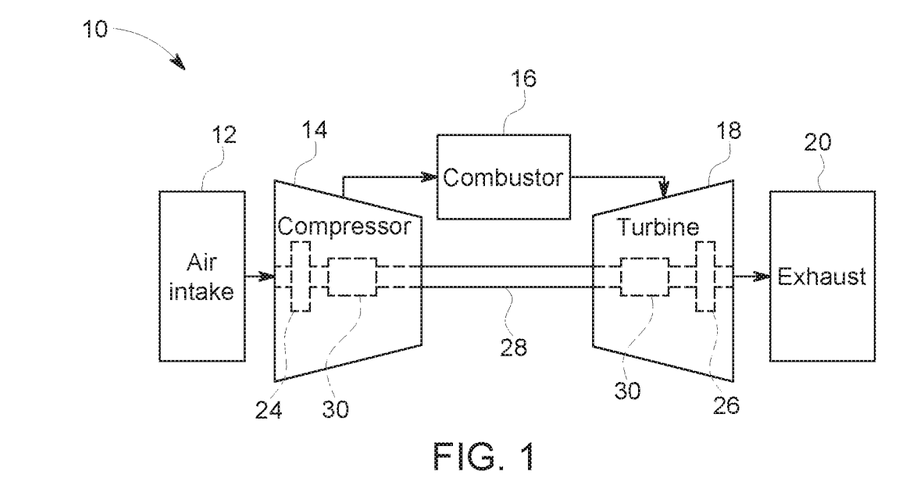
FIG. 1 is a block diagram of a turbomachine system, in accordance with an embodiment.

To help illustrate, one embodiment of a turbomachine system 10 is described in FIG. 1. In some embodiments, the turbomachine system 10 may be a turbine engine, a gas turbine engine, a steam turbine engine, a centrifugal compressor, a turbocharger, a jet engine, or the like. As depicted, the turbomachine system 10 includes an air intake 12, a compressor 14, a combustor 16, a turbine 18, and an exhaust 20. Additionally, the turbomachine system 110 includes a rotor assembly, which includes compressor blades 24, turbine blades 26, and a drive shaft 28.

In operation, the air intake 12 may draw air into the turbomachine system 10 (e.g., from the ambient atmosphere) and direct the air into the compressor 14. In the compressor 14, the air may be compressed by rotation of the compressor blades 24 to produce compressed air. In this manner, the turbomachine system 10 may transfer energy from the rotor assembly (e.g., compressor blades 24) to a fluid (e.g., compressed air).

The compressed air may then be mixed with fuel (e.g., gasoline or jet fuel) and combusted (e.g., burned) in the combustor 16 to produce combustion gas. The combustion gas may then flow through the turbine 18 and be exhausted from the turbomachine system 10 via the exhaust 20 (e.g., to the ambient atmosphere). In the turbine 18, the combustion gas may flow over the turbine blades 26, thereby rotating (e.g., actuating) the turbine blades 26. In this manner, the turbomachine 10 may transfer energy from a fluid (e.g., combustion gas) to the rotor assembly (e.g., turbine blades 26).

As depicted, the turbine blades 26 are coupled to the drive shaft 28. In some embodiments, the turbine blades 26 may be mechanically coupled to the drive shaft 28 such that rotation of the turbine blades 26 also rotates the drive shaft 28. Additionally, as depicted, the drive shaft 28 is coupled to compressor blades 24. In some embodiments, the compressor blades 24 may be mechanically coupled to the drive shaft 28 such that rotation of the drive shaft 28 also rotates the compressor blades. Additionally, in some embodiments, the drive shaft 28 may be mechanically coupled to an external load, such as an electrical generator and/or a mechanical drive (e.g., a pump or a propeller). In this manner, rotation of the drive shaft 28 may supply mechanical energy to loads, such as the compressor blades 24 and/or an external load.

Additionally, as depicted, the turbomachine system 10 includes bearing damper assemblies 30 along the drive shaft 28. Specifically, in the depicted embodiment, one bearing damper assembly 30 is located in the compressor 14 and another bearing damper assembly 30 is located in the turbine 18. In other embodiments, the turbomachine system 10 may include one or more bearing damper assemblies 30 at various suitable locations along the drive shaft (e.g., not limited to the compressor 14 and the turbine 18).

Figure 2:
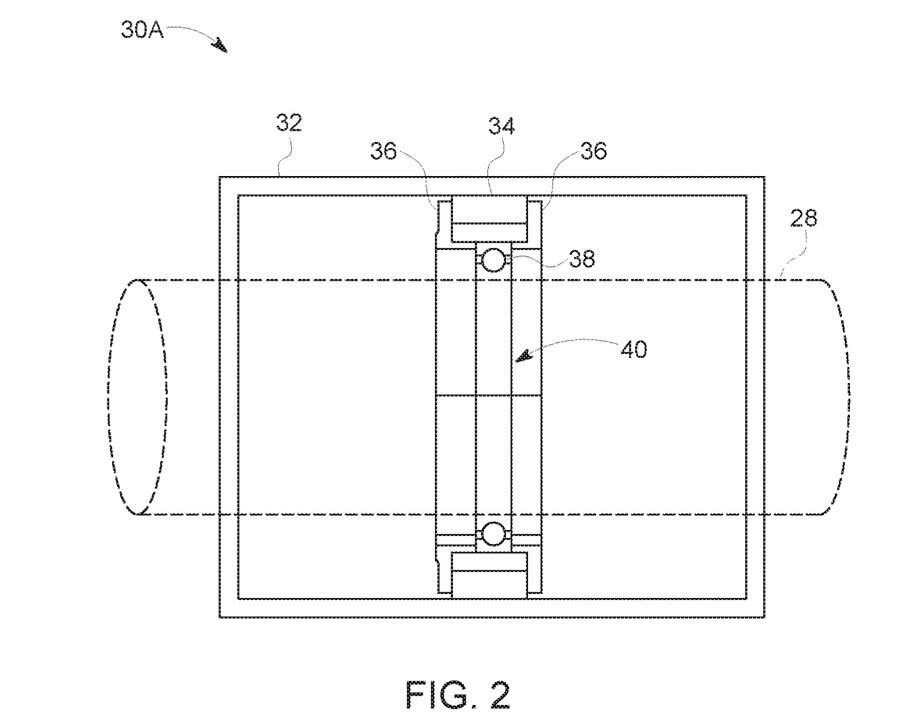
FIG. 2 is a side cross-sectional view of a bearing damper assembly in the turbomachine system of FIG. 1, in accordance with an embodiment.

To help illustrate, one embodiment of a bearing damper assembly 30A is described in FIG. 2. As depicted, the bearing damper assembly 30A includes a housing 32, a damper 34, end seals 36, and bearings 38. In the depicted embodiment, the outer surface (e.g., outer rim) of the damper 34 is coupled to the inner surface of the housing 32. In some embodiments, the damper 34 may be fixedly coupled (e.g., secured) to the housing 32 using screws, nuts, and/or other suitable fastening mechanisms. In such embodiments, movement of the outer surface of the damper 34 relative to the housing 32 may be limited.

Additionally, as depicted, the bearings 38 are coupled to an inner surface of the damper 38 and define an annular region 40, which may support the drive shaft 28. As described above, the bearings 38 may facilitate rotation of the drive shaft 28, for example, by reducing friction that resists rotation. For example, in the depicted embodiments, the bearings 38 are ball bearings. However, in other embodiments, the bearings 38 may be any suitable type, such as journal bearings (e.g., porous bearing pads that deliver gas into the annular region 40).

Thus, the bearings 38 may be coupled between the damper 34 and the drive shaft 28. As such, the drive shaft 28 may exert force through the bearings 38 onto the damper 34. For example, gravity may pull downward on drive shaft 28, thereby causing the drive shaft 28 to exert a radial force on the damper 34. Additionally, thrust from movement of the turbomachine system 10 may cause the drive shaft 28 to exert an axial force on the damper 34.

Furthermore, vibrations produced on the drive shaft 28 (e.g., due to mass imbalance) may propagate into the damper 34. In some instances, vibrations may affect operation of the turbomachine 10, for example, by disturbing/displacing other components. As such, the damper 34 may be used to dampen (e.g., dissipate) vibrations, thereby reducing likelihood of vibrations affecting operation of the turbomachine 10.

Various types of dampers 34 may be used to dampen vibrations. For example, in the depicted embodiment, the damper 34 is a squeeze film damper that utilizes fluid in an annular gap formed between an inner diameter and an outer diameter of the damper 34. In such embodiments, damping characteristics (e.g., targeted frequencies and/or damping value) of the damper 34 may be dependent at least in part on pressure of the fluid in the annular gap. To facilitate controlling pressure of the fluid, as depicted, the end seals 36 are coupled on both side surfaces of the damper 34.

In some embodiments, the fluid pressure in a squeeze film damper may be actively controlled (e.g., in real-time during operation of the turbomachine system 10) by pumping fluid from the housing 32, through the annular gap, and out of through the end seals 36. In other embodiments, the annular gap may be hermetically sealed and, thus, fluid pressure may be passively controlled (e.g., off-line before deployment of the damper 34). Additionally, in some embodiments, a squeeze film damper (e.g., a two pi squeeze film damper) may include a single uninterrupted annular gap between its inner diameter and its outer diameter. In other embodiments, a squeeze film damper (e.g., a segmented squeeze film damper) may include multiple annular gaps between its inner diameter and its outer diameter, which may facilitate improving damping performance. For example, compared to a two pi squeeze film damper, a segmented squeeze film damper may have a higher damping value and/or reduce likelihood of conditions that affect the damping characteristics, such as cavitation and/or air ingestion.

Figure 3:
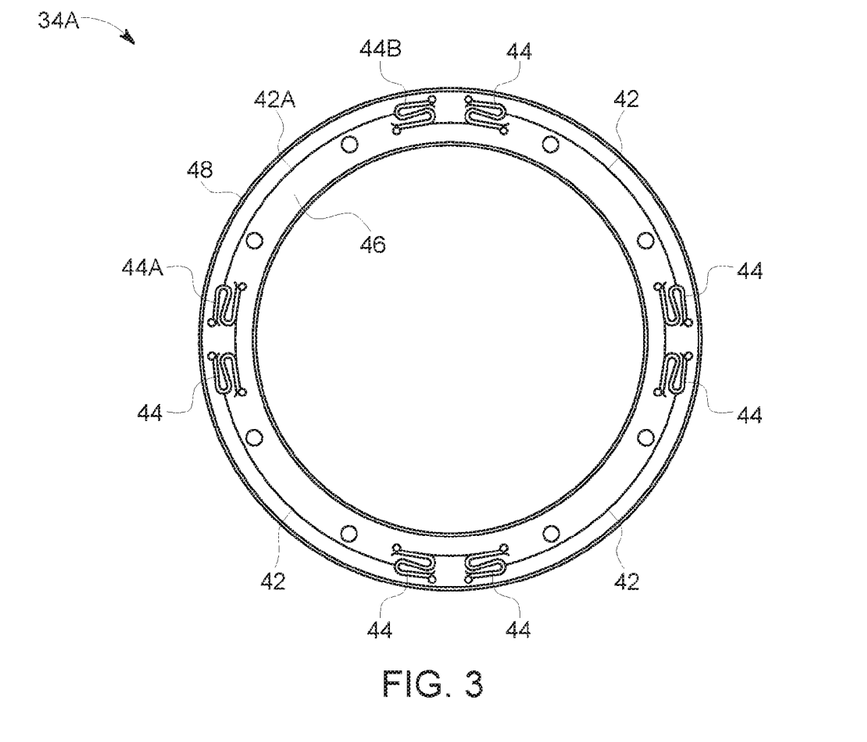
FIG. 3 is a perspective view of a segmented squeeze film damper in the bearing damper assembly of FIG. 2, in accordance with an embodiment.

For illustrative purposes, one non-limiting example of a segmented squeeze film damper 34A is described in FIG. 3. As depicted, the segmented squeeze film damper 34A includes annular gaps 42 formed between an inner rim 46 rim of the segmented squeeze film damper 34A and an outer rim 48 of the segmented squeeze film damper 34A. For example, in the depicted embodiment, the segmented squeeze film damper 34A includes a first annular gap 42A formed between the inner rim 46 and the outer rim 48.

Additionally, as depicted, the annular gaps 42 are bounded circumferentially by internal springs 44. For example, in the depicted embodiment, the segmented squeeze film damper 34A includes a first annular gap 42A bounded by a first internal spring 44A and a second internal spring 44B. In other embodiments, the segmented squeeze film damper 34A may include two or more annular gaps 42 bounded by internal springs 44.

By utilizing multiple annular gaps 42, the segmented squeeze film damper 34 may increase viscous resistance, thereby reducing likelihood of circumferential flow, which may enable increasing radial gap (e.g., size) of the annular gaps 42. In this manner, the amount of fluid in an annular gap 42 may be increased, which may facilitate increasing damping value of the segmented squeeze film damper 34A and/or reducing likelihood of conditions (e.g., cavitation and/or air ingestion in the annular gap 42) that affect damping value of the segmented squeeze film damper 34A. As described above, the damping characteristics of a damper 34 may also be affected by fluid pressure within the annular gaps 42. In some embodiments, the fluid pressure may be actively controlled by controlling flow of fluid through the annular gaps.

Figure 4:
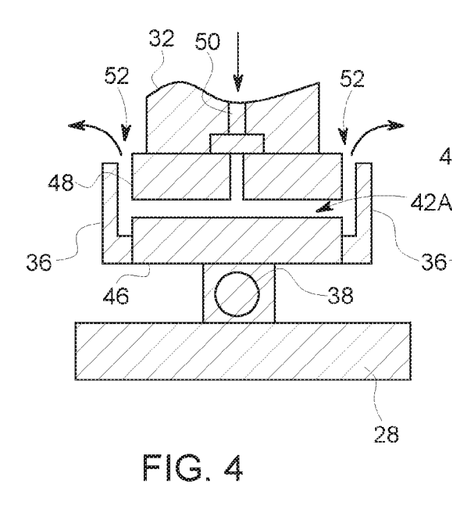
FIG. 4 is a cross-sectional view of a portion the bearing damper assembly of FIG. 2, in accordance with an embodiment.

To help illustrate, a cross sectional view of a portion of the bearing damper assembly 30A including the first annular gap 42A is described in FIG. 4. As depicted, the housing 32 is coupled to the outer rim 48 of the segmented squeeze film damper 34A and includes an inlet port 50 fluidly coupled to the first annular gap 42A through the outer rim 48. In this manner, fluid may flow from the housing 32, through the inlet port 50, and into the first annular gap 42.

Additionally, as depicted, the end seals 36 each includes an outlet port 52 fluidly coupled to the first annular gap 42A. In this manner, fluid may flow from the first annular gap 42 out the outlet ports 52. In some embodiments, the fluid may flow through the outlet ports 52 into a reservoir (not depicted), for example, back in the housing 32.

As such, fluid pressure in the first annular gap 42A may depend on difference between inflow rate of the fluid through the inlet port 50 and outflow rate of fluid through the outlet ports 52. In some embodiments, a pump (not depicted) may be utilized to pump fluid through the inlet port 50, thereby controlling the inflow rate of the fluid and, thus, the fluid pressure in the first annular gap 42A. In a similar manner, fluid pressure in other annular gaps 42 may be actively controlled.

Furthermore, as depicted, a bearing 38 is coupled between the drive shaft 28 and the inner rim 46 of the segmented squeeze film damper 46. As such, the drive shaft 28 may exert force on the segmented squeeze film damper 46 through the bearing 38. For example, due to gravity, the drive shaft 28 may exert radial force on the segmented squeeze film damper 34A. Additionally, thrust produced by movement of the turbomachine system 10 may cause the drive shaft 28 to exert axial force on the segmented squeeze film damper 34A. When insufficiently offset, the forces exerted on the segmented squeeze film damper 34A may affect fluid pressure in the annular gaps 42 and, thus, damping characteristics of the segmented squeeze film damper 34A

Figure 5:
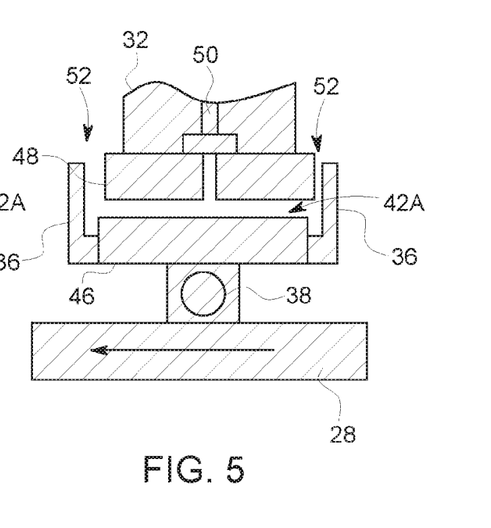
FIG. 5 is a cross sectional view of the portion of the bearing damper assembly of FIG. 2, in accordance with an embodiment.

To help illustrate, the cross sectional view of the portion of the bearing assembly 30A including the first annular gap 42A when the drive shaft 28 exerts an axial force is described in FIG. 5. As depicted, the axial force causes the inner rim 46 to deflect in an axial direction relative to the outer rim 48, which is secured to the housing 32. In the depicted example, the deflection cause size of the outlet ports 52 to change, which may cause a change in fluid pressure in the annular gap 42. In fact, when large enough, the axial force may cause the segmented squeeze film damper 34A to bottom out (e.g., when the outer rim 48 contacts an end seal 36).

To facilitate improving predictability of damping characteristics, axial and/or radial forces exerted on the damper 34 may be compensated. In some embodiments, the damper 34 may internally offset the axial and/or radial forces, for example, by increasing stiffness of the internal springs 44. However, as described above, adjusting stiffness of the internal springs 44 to offset radial and/or axial forces may limit tuning flexibility and, thus, ability to tune the damper 34 to target damping characteristics. Thus, in other embodiments, the axial and/or radial forces may be offset external from the damper 34. For example, an external spring may be coupled to the damper 34 to externally offset the axial and/or radial forces, thereby enabling the internal springs 44 primarily to be used to circumferentially bound the annular gaps 42.

Figure 6:
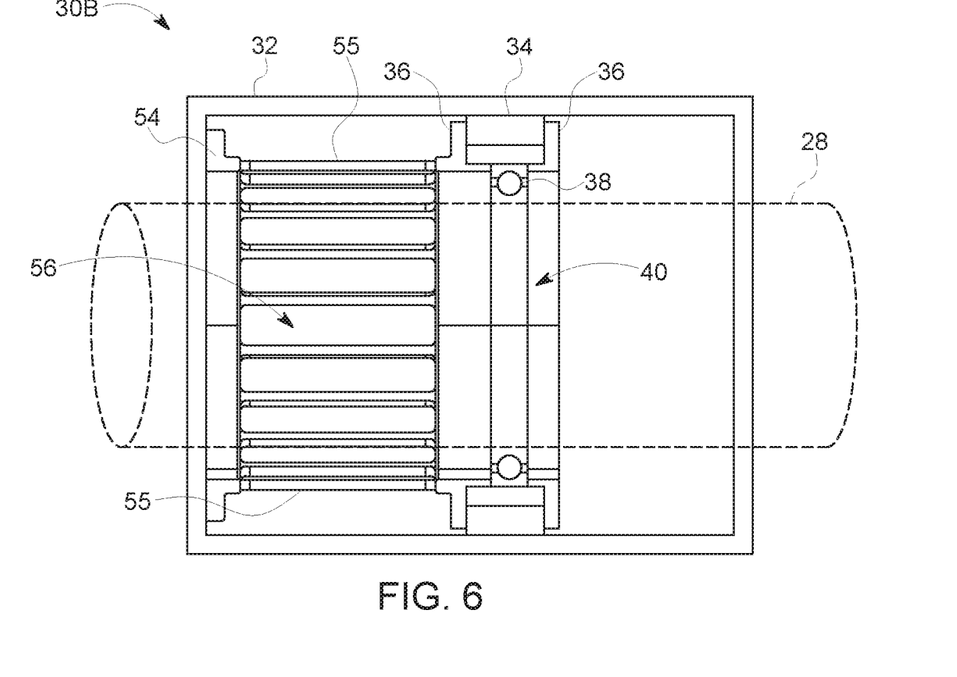
FIG. 6 is a side cross-sectional view of a bearing damper assembly with an external support spring in the turbomachine system of FIG. 1, in accordance with an embodiment.

To help illustrate, another embodiment of a bearing damper assembly 30B, which utilizes an external spring 54, is described in FIG. 6. As depicted, the external spring 54 includes multiple spring fingers 55, which define an annular region 56. In this manner, the external spring 54 may reduce likelihood of the external spring 54 interfering with rotation of the drive shaft 28.

Additionally, as depicted, one end of the external spring 54 is coupled to an inner surface of the housing 32. In some embodiments, the external spring 54 may be fixedly coupled (e.g., secured) to the housing 32 and/or the damper 34 using screws, nuts, and/or other suitable fastening mechanisms. In such embodiments, movement of the external spring 54 relative to the housing 32 may be limited.

The other end of the external spring 54 may be coupled to the damper 34 to limit movement of the damper 34 relative to the external spring 54. In the depicted embodiment, the external spring 54 is integrated with one of the end seals 36. Thus, as depicted, external spring 54 is directly coupled to the damper 34. In other embodiments, the external spring 54 and the end seal 36 may be separate components. In such embodiments, the external spring 54 may be fixedly coupled (e.g., secured) to the end seal 36 and the end seal 36 may be fixedly coupled to the damper 34, for example, using screws, nuts, and/or other suitable fastening mechanisms.

Since coupled to the damper 34, force exerted on the damper 34 may be transferred to the external spring 54. Additionally, in some embodiments, the external spring 54 may be formed from a relatively rigid material, such as steel. As such, the external spring 54 may be tuned to offset axial and/or radial forces exerted on the damper 34, thereby limiting movement of the damper 34 that may unpredictably affect damping characteristics.

Figure 7:
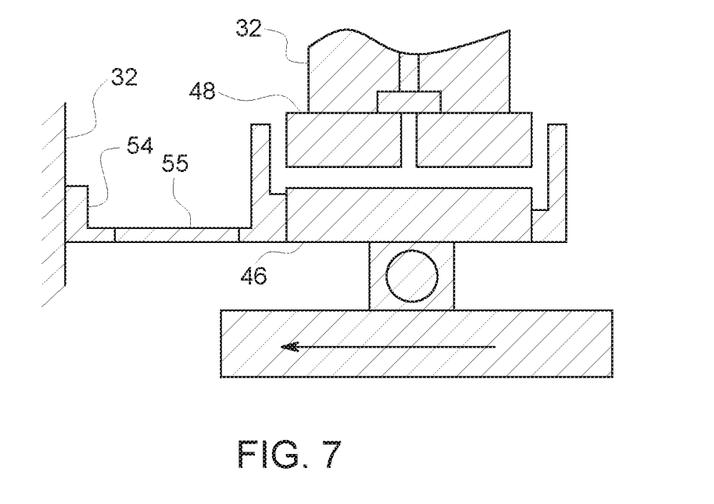
FIG. 7 is a cross-sectional view of a portion of the bearing damper assembly of FIG. 6, in accordance with an embodiment.

To help illustrate, a cross sectional view of the bearing damper assembly 30B including the first annular gap is described in FIG. 7. Similar to the bearing damper assembly 30A without the external spring 54, as depicted, the outer rim 48 of the segmented squeeze film damper 34A is coupled to the housing 32. As described above, this may limit movement of the outer rim 48 relative to the housing 32, for example even when an axial force is applied.

Additionally, as depicted, a finger 55 of the external spring 54 is coupled to the housing 32 and to the inner rim 46 of the segmented squeeze film damper 34A. Thus, axial and/or radial force exerted on the inner rim 46 may be transferred to the finger of the external spring 54. In this manner, rigidity of the fingers 55 may offset at least a portion of the axial and/or radial forces, thereby limiting movement of the inner rim 46 relative to the housing 32 and, thus, movement of the inner rim 46 relative to the outer rim 48.

Moreover, the physical configuration of the external spring 54 may enable the axial stiffness and the radial stiffness to be relatively independently adjusted. For example, to adjust the radial stiffness, the length of the fingers 55 may be adjusted, the number of fingers 55 may be adjusted, and/or the cross-section of the fingers 55 may be adjusted.

It should be appreciated that the depicted external spring 54 is merely intended as an illustrative example. In other embodiments, the external spring 54 may be any suitable external mechanism that limits movement of the inner rim 46 relative to the outer rim 38. For example, the external spring 54 may wrap from the inner rim 46 directly to the outer rim 48. Additionally or alternatively, the external spring may be coupled (e.g., directly or indirectly through other components) between the inner rim 46 and any suitable surface of the housing 32.

Figure 8:
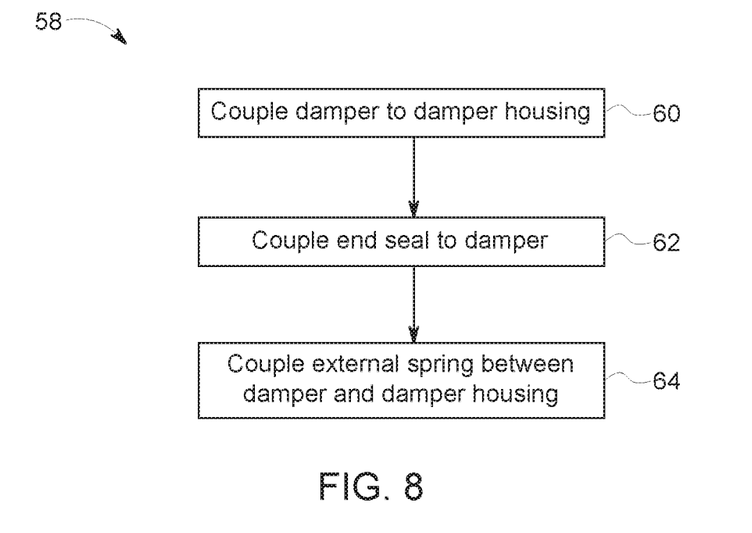
FIG. 8 is a flow diagram of a process for assembling a bearing damper assembly with an external support spring, in accordance with an embodiment.

One embodiment of a process 58 for assembling (e.g., manufacturing) a bearing damper assembly 30 with an external spring 54 is described in FIG. 8. Generally, the process 58 includes coupling a damper to a damper housing (process block 60), coupling an end seal to the damper (process block 62), and coupling an external spring between the damper and the damper housing (process block 64). In some embodiments, the process 60 may be performed manually and/or by executing instructions stored in a tangible, non-transitory, computer-readable medium before operation of the bearing damper assembly 30. Additionally, in some embodiments, the bearing damper assembly 30 may be assembled in a factory by a manufacturer and, in other embodiments, during deployment in a turbomachine system 10.

In some embodiments, an outer surface of the outer rim 48 of the damper 34 may be coupled to an inner surface of the housing 32 (process block 60). As described above, the damper 34 may be coupled to the housing 32 to limit movement of the outer rim 48 relative to the housing 32. Thus, various techniques sufficiently capable of limiting movement may be used to couple the damper 34 to the housing 32. For example, in some embodiments, a fastening mechanism, such as a screw and/or glue, may be coupled between the housing 32 and the damper 34. Additionally, in some embodiments, the damper 34 and the housing 32 may be fused (e.g., welded) together. In further embodiments, the damper 34 and the housing 32 may be formed as a single component.

Additionally, in some embodiments, an end seal 36 may be coupled to a side surface of the damper 34 (process block 62). As described above, an end seal 36 may at least in part to control fluid pressure in annular gaps 42 of the damper 34, for example, by forming an outlet port 52 that enables fluid in an annular gap 42 to be expelled. Thus, various techniques capable of enabling an end seal 36 to control fluid pressure may be used to couple the end seal 36 to the damper 34. For example, in some embodiments, a fastening mechanism, such as a screw and/or glue, may be coupled between the end seal 36 and the damper 34. Additionally, in some embodiments, the end seal 36 and the damper 34 may be fused (e.g., welded) together. In further embodiments, the damper 34 and the end seal 36 may be formed as a single component.

Furthermore, in some embodiments, the external spring 54 may be coupled between an inner surface of the housing 32 and the inner rim 46 of the damper 34 (process block 64). As described above, the external spring 54 may be coupled between the housing 32 and the inner rim 46 to limit axial movement of the inner rim 46 relative to the housing 32 and, thus, the outer rim 48. Thus, various techniques sufficiently capable of limiting movement may be used to couple the external spring 54 between the housing 32 and the damper 34. For example, in some embodiments, a first fastening mechanism, such as a screw and/or glue, may be coupled between the housing 32 and the external spring 54 and a second fastening mechanism may be coupled between the external spring 54 and the damper 34. Additionally, in some embodiments, the external spring 54 may be fused (e.g., welded) with the housing 32 and/or with the damper 54. In further embodiments, the external spring 54 may be formed as a single component with the housing 32 and/or the damper 34.

As described above, in some embodiments, the external spring 54 may be integrated with an end seal 36. Thus, in such embodiments, the external spring 54 may be directly coupled to the damper 34. In other embodiments, the external spring 54 and the end seal 36 may be separate components. In such embodiments, the external spring 54 may be coupled to an end seal 36, which is coupled to the damper 34.

As described above, the external spring 54 may limit movement of the inner rim 46 of the damper 34 relative to the housing 32 by offsetting (e.g., compensating) axial and/or radial forces exerted on the damper 34, for example, by the drive shaft 28. Since movement of the outer rim 46 relative to the housing 32 is also limited, the external spring 54 may facilitate limiting axial movement of the inner rim 46 of the damper 34 relative to the outer rim 48 of the damper 34. As such, likelihood of unpredictable changes in damping characteristics (e.g., dampened vibration frequency and/or damping value) caused by movement of the inner rim 46 relative to the outer rim 48 may be reduced.

Moreover, as described above, using the external spring 54 may improve operational efficiency by enabling axial stiffness and radial stiffness of the bearing damper assembly 30 to be relatively independently tuned. For example, the axial stiffness of the external spring 54 may be tuned to substantially offset any axial forces exerted on the damper 34, thereby reducing likelihood of axial movement that may unpredictably affect damping characteristics of the damper 34. Additionally, while maintaining approximately the same axial stiffness, the radial stiffness of the external spring 54 may be tuned to allow some radial movement in the damper 34. For example, the radial stiffness of the external spring 54 may be tuned to vibrations to propagate through the damper 34 while offsetting other radial forces, thereby reducing likelihood of radial deflections that may unpredictably affect damping characteristics of the damper 34. In some embodiments, a tuning system may tune the bearing assembly 30 to determine properties of the external spring 54, such as axial stiffness and radial stiffness, and/or properties of the damper 34, such as stiffness of internal springs 44.

Technical effects of the present disclosure include improving tuning flexibility of a damper in a bearing damper assembly, which may facilitate improving operational efficiency (e.g., damping capabilities) of the bearing damper assembly. In some embodiments, an external spring may be used to offset axial and/or radial forces, which may cause the damper to exhibit unpredictable damping characteristics, exerted on the damper. In some instances, the degree to which the axial forces are offset and the degree to which radial forces are offset may vary. Accordingly, to facilitate improving tuning flexibility, the external spring may enable axial stiffness (e.g., ability to offset axial forces) and radial stiffness (e.g., ability to offset radial forces) to be relatively independently tuned. For example, this may enable the axial stiffness to be relatively independently tuned to reduce likelihood of axial movement causing unpredictable damping characteristics. Additionally, this may enable the radial stiffness to relatively independently tuned (e.g., engineered) to reduce likelihood of radial movement causing unpredictable damping characteristics while permitting the damper to dissipate vibrations, likelihood of the damper cavitating, and/or damping value sufficient to dissipate vibrations at the natural frequency.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A bearing damper assembly configured to be used in a turbomachine system, comprising:
   a housing;
   a segmented squeeze film damper comprising a first annular gap and a first internal spring, wherein the first annular gap is formed between an inner rim and an outer rim of the segmented squeeze film damper, the first internal spring circumferentially bounds the first annular gap, the outer rim is coupled to the housing, and the first annular gap is configured to be filled with fluid used to dampen vibrations produced on a drive shaft of the turbomachine system;
   an external spring coupled to the housing and to the inner rim of the segmented squeeze film damper, wherein the external spring is tuned to adjust:
      an axial stiffness of the external spring to externally offset axial forces exerted on the inner rim of the segmented squeeze film damper; and
      a radial stiffness of the external spring to externally offset a first portion of radial forces exerted on the inner rim segmented squeeze film damper and to permit a second portion of the radial forces to propagate the vibrations from the drive shaft to the inner rim; and
   a first end seal coupled to the segmented squeeze film damper, wherein:
      the first end seal comprises a first outlet port fluidly coupled to the first annular gap; the first outlet port is configured to control outflow rate of the fluid from the first annular gap; and
      the axial stiffness of the external spring is adjusted to facilitate maintaining size of the first outlet port constant during operation of the turbomachine system.

2. The bearing damper assembly of claim 1, wherein the external spring is configured to enable independently tuning the axial stiffness and the radial stiffness.

3. The bearing damper assembly of claim 1, wherein:
   the outer rim of the segmented squeeze film damper is coupled to an inner surface of the housing;
   a first end of the external spring is coupled to the inner surface of the housing; and
   a second end of the external spring is coupled to the inner rim of the segmented squeeze film damper.

4. The bearing damper assembly of claim 1, wherein:
   the external spring comprises a second end seal coupled to the segmented squeeze film damper, wherein the second end seal comprises a second outlet port fluidly coupled to the first annular gap;
   the second outlet port is configured to control the flow rate of the fluid out of the first annular gap; and
   the axial stiffness of the external spring is configured to facilitate maintaining size of the second outlet port constant during operation of the turbomachine system.

5. The bearing damper assembly of claim 1, wherein the first annular gap is hermetically sealed.

6. The bearing damper assembly of claim 1, wherein the segmented squeeze film damper comprises:
   a second internal spring that circumferentially bounds the first annular gap;
   a second annular gap circumferentially bounded by a third internal spring and a fourth internal spring;
   a third annular gap circumferentially bounded by a fifth internal spring and a sixth internal spring; and
   a fourth annular gap circumferentially bounded by a seventh internal spring and an eighth internal spring.

7. The bearing damper assembly of claim 1, wherein the first annular gap extends partially along a circumference between the inner rim and the outer rim of the segmented squeeze film damper.

8. The bearing damper assembly of claim 1, wherein:
   the external spring comprises a plurality of fingers extending parallel to the drive shaft between the housing and the segmented squeeze film damper;
   the number, size, material composition, configuration, or any combination thereof of the plurality of fingers is tuned to adjust the radial stiffness of the external spring without adjusting the axial stiffness of the external spring when the external spring completely offsets the axial forces.

9. The bearing damper assembly of claim 1, wherein the turbomachine system comprises a compressor, a turbine engine, or both.

10. A method of manufacturing a bearing damper assembly configured to be used in a turbomachine system, comprising:
    coupling an outer rim of a damper to an inner surface of a housing such that an inlet port formed in the housing is fluidly coupled to an annular gap formed partially along a circumference between the outer rim and an inner rim of the damper, wherein the annular gap is configured to be filled with fluid used to dampen vibrations produced during operation of the turbomachine system;
    coupling a first end seal to a first side surface of the inner rim such that a first outlet port formed in the first end seal is fluidly coupled to the annular gap;
    coupling a first end of an external spring to the inner surface of the housing; and
    coupling a second end of the external spring to a second side surface of the inner rim, wherein the external spring is configured to facilitate:
       tuning axial stiffness of the external spring to substantially offset axial forces exerted on the inner rim to facilitate maintaining size of the first outlet port substantially constant during operation of the turbomachine system; and
       tuning radial stiffness of the external spring relatively independent from the axial stiffness to substantially offset a first portion of radial forces exerted on the inner rim to facilitate maintaining average size of the annular gap substantially constant during operation of the turbomachine system.

11. The method of claim 10, comprising fluidly coupling a pump to the inlet port to enable the pump to supply the fluid to the annular gap.

12. The method of claim 10, wherein the damper comprises a segmented squeeze film damper.

13. The method of claim 10, wherein:
the external spring comprises a second end seal;
coupling the second end of the external spring to the second side surface of the inner rim comprises fluidly coupling the annular gap and a second outlet port of the second end seal; and
the axial stiffness of the external spring is tuned to facilitate maintaining size of the second outlet port substantially constant during operation of the turbomachine system.

14. A turbomachine system comprising an external spring, wherein the external spring comprises:
a first end configured to be coupled to an inner surface of a housing that houses a damper by coupling to an outer rim of the damper;
a second end configured to be coupled to a first side surface of an inner rim of the damper;
a plurality of spring fingers formed between the first end and the second end of the external spring, wherein the plurality of spring fingers is tuned to adjust:
an axial stiffness of the external spring to externally offset axial forces exerted on the inner rim of the damper to facilitate maintaining size of an outlet port on the damper substantially constant during operation of the turbomachine system; and
a radial stiffness of the external spring to:
facilitate propagating vibrations produced during operation of the turbomachine system to the damper; and
externally offset other radial forces exerted on the inner rim of the damper to facilitate maintaining average distance between the inner rim and the outer rim of the damper;
wherein the second end of the external spring comprises an end seal configured to form the outlet port with the side surface of the damper.

15. The turbomachine system of claim 14, comprising a mechanical energy source configured to actuate a drive shaft during operation of the turbomachine system, wherein:
the vibrations are produced on the drive shaft; and
the damper is configured to dissipate the vibrations using fluid in an annular gap formed between the inner rim and the outer rim of the damper.

16. The turbomachine system of claim 15, wherein each of the plurality of spring fingers is formed in a direction parallel with the drive shaft.

17. The turbomachine system of claim 14, wherein the external spring comprises a squirrel cage.

18. The turbomachine system of claim 14, wherein the turbomachine system comprises a turbine engine, a gas turbine engine, a steam turbine engine, a centrifugal compressor, a turbocharger, a jet engine.

* * * * *